Feb. 20, 1945.   H. HJORT   2,369,897
PHOTOGRAPHIC ENLARGING MACHINE
Filed Feb. 12, 1943   3 Sheets-Sheet 1
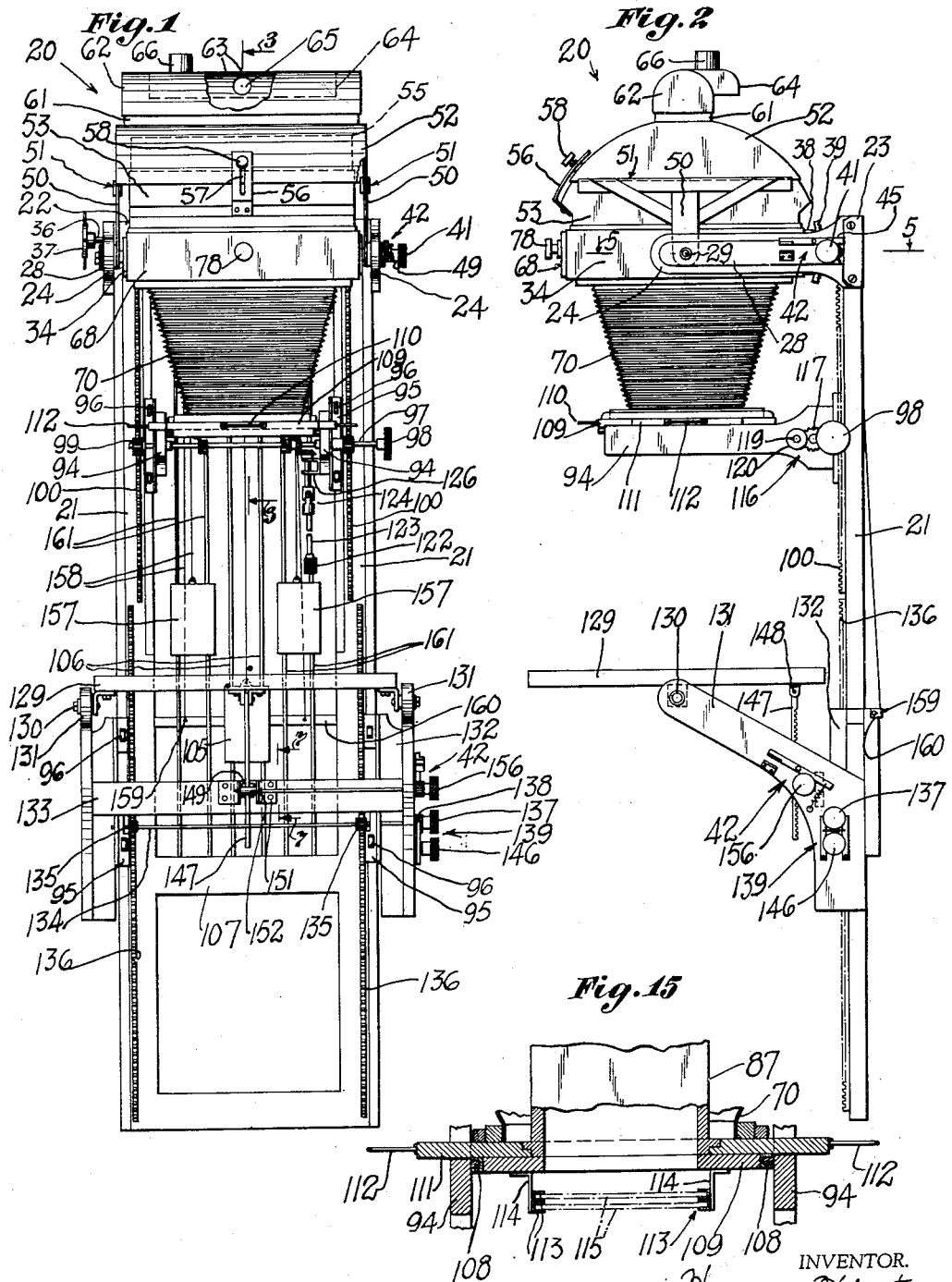
INVENTOR.
Henry Hjort
BY
ATTORNEY.

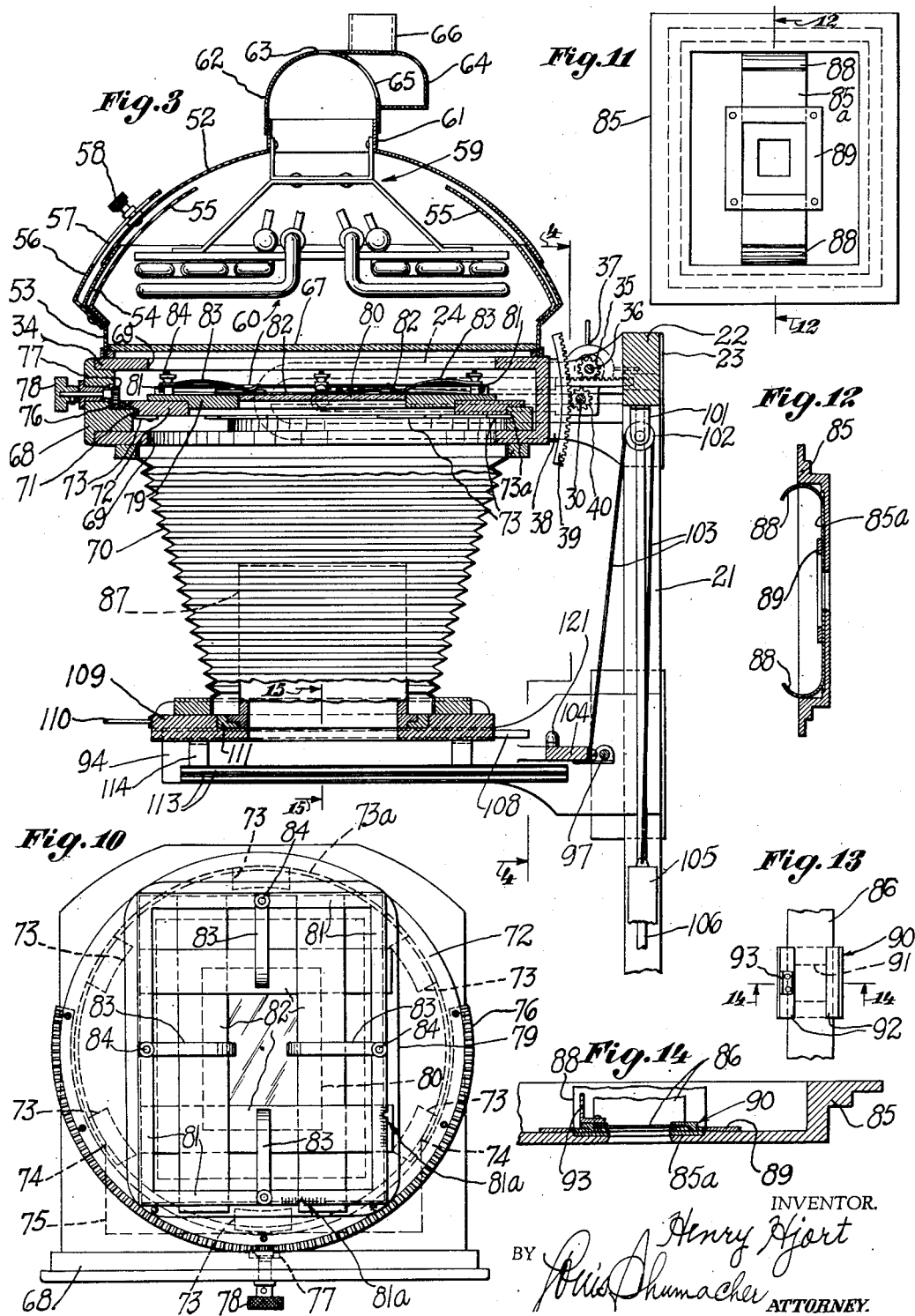

Feb. 20, 1945. H. HJORT 2,369,897
PHOTOGRAPHIC ENLARGING MACHINE
Filed Feb. 12, 1943 3 Sheets-Sheet 3
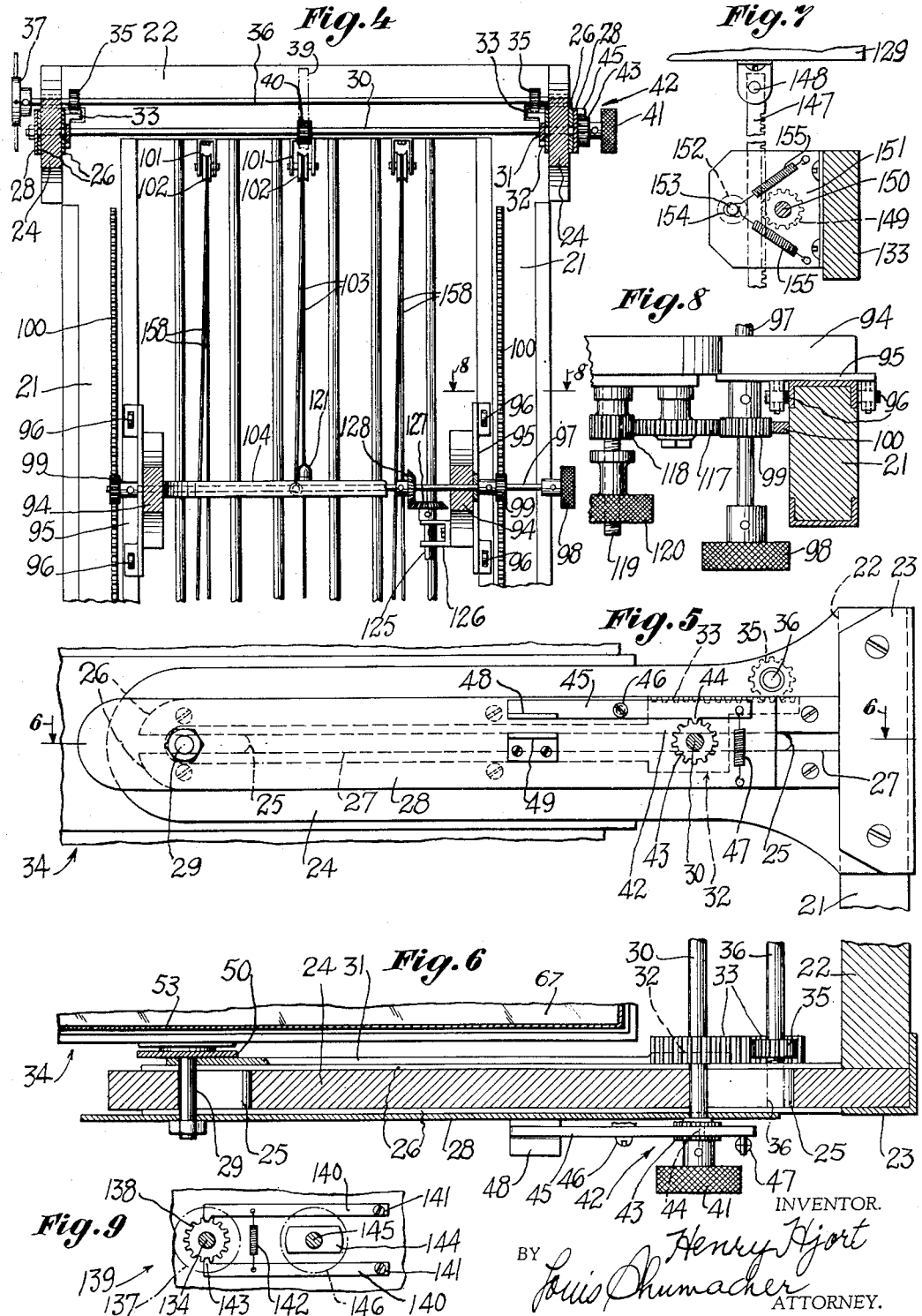
INVENTOR.
Henry Hjort
BY Louis Shumacher
ATTORNEY.

Patented Feb. 20, 1945

2,369,897

UNITED STATES PATENT OFFICE 2,369,897

PHOTOGRAPHIC ENLARGING MACHINE

Henry Hjort, Bay Terrace, Staten Island, N. Y.

Application February 12, 1943, Serial No. 475,693

2 Claims. (Cl. 88—24)

This invention relates to photographic apparatus and has particular reference to photographic enlarging machines.

One object of the invention is to provide improved means comprising a light source and reflector and a spaced tiltable film holder to permit the photographic enlargement to appear to have been taken at a different angle than the picture on the film.

Another object of the invention is to provide an apparatus of the type mentioned wherein the light source and reflector unit and the spaced film holder are independently tiltable in an improved manner for different angular effects.

Another object of the invention is to provide improved means whereby the lens unit is laterally movable in a practically universal manner for centering the image on the work table.

Another object of the invention is the provision of photographic apparatus, such as enlarging machines, wherein a plurality of light conducting chambers are mounted for relative tilting movement to each other, with a bellows interengaging the same and being in slidable relation to one of the chambers for lateral adjustment of the same according to said tilting action, to avoid straining the bellows and to prevent the bellows from interfering with the setting of certain parts such as a lens unit or causing accidental shifting thereof.

Another object of the invention is the provision of improved means for the lateral adjusting movement of a film holding chamber in certain novel relations to cooperating parts of the enlarging apparatus.

Another object of the invention is to provide a photographic enlarging machine having a light conducting chamber, such as a lens unit element, slidably mounted for non friction movement on tracks along a support with counterweights for the individual elements to facilitate easy movement thereof.

Another object of the invention is the provision of a photographic enlarging machine having lens unit element and work table elements and improved means comprising a support with racks engaged by pinions operable to adjustably cause individual accurate setting movement of the elements.

Another object of the invention is to furnish a photographic enlarging machine having one or more film holding elements slidable along a support, and being angularly settable, with means for locking the same in angularly set position without interfering with the sliding movement.

Another object of the invention is to provide photographic enlarging apparatus with improved locking means for accurately locking a slidable or tiltable element in set position in an easily releasable manner.

Another object of the invention is the provision of a photographic enlarging apparatus having a film holder and a lens holder connected by a bellows to the film holder, the lens holder being inside of the bellows to bring it close to the film holder.

Another object of the invention is to provide an improved photographic enlarging apparatus having a plurality of film holders of different sizes with one of the film holders removable and the resulting aperture closed by a film holder of different size.

Other objects and advantages of the invention will become apparent as the specification proceeds.

With the aforesaid objects in view, the invention consists in the novel combinations and arrangements of parts hereinafter described in their preferred embodiments, pointed out in the subjoined claims, and illustrated in the annexed drawings, wherein like parts are designated by the same reference characters throughout the several views.

In the drawings:

Fig. 1 is a view in front elevation showing an apparatus embodying the invention, with a part removed.

Fig. 2 is a view in side elevation thereof with certain rack parts shown in dot-dash lines.

Fig. 3 is an enlarged fragmentary sectional view taken on line 3—3 of Fig. 1.

Fig. 4 is a sectional view taken on the broken line 4—4 of Fig. 3.

Fig. 5 is an outside fragmentary enlarged view of a section taken on line 5—5 of Fig. 2, showing a supporting arm and a means for causing lateral frontward movement of the film holding chamber.

Fig. 6 is a sectional view taken on line 6—6 of Fig. 5.

Fig. 7 is a fragmentary enlarged view of certain details of the means for tilting the work table, with parts in section along line 7—7 of Fig. 1.

Fig. 8 is an enlarged sectional view taken on line 8—8 of Fig. 4.

Fig. 9 is an enlarged fragmentary view of a locking device for the work table elevating means, shown in Figs. 1 and 2.

Fig. 10 is a plan view of the film holding slide means, shown in Fig. 3, removed from the apparatus.

Fig. 11 is a plan view of a film holding element that is interchangeable with an element for holding large size film as shown in Fig. 10.

Fig. 12 is a sectional view on the line 12—12 of Fig. 11.

Fig. 13 is a plan view of a removable member for holding a film strip, with a portion of the latter shown therein, and said member being adapted to be applied to the center frame of the film holder of Fig. 11.

Fig. 14 is an enlarged fragmentary sectional view on line 14—14 of Fig. 13, but showing said member applied to the film holder of Fig. 11, which is here shown in section.

Fig. 15 is a sectional view taken on line 15—15 of Fig. 3.

The advantages of the invention as here outlined are best realized when all of its features and instrumentalities are combined in one and the same structure, but, useful devices may be produced embodying less than the whole.

It will be obvious to those skilled in the art to which the invention appertains, that the same may be incorporated in several different constructions. The accompanying drawings, therefore, are submitted merely as showing the preferred exemplification of the invention.

Referring in detail to the drawings, 20 denotes an apparatus embodying the invention. The same may include any suitable support which may comprise a pair of upright standards 21 that may be interconnected by cross bars, including a cross bar 22 at the top thereof as shown in Fig. 3. The standards 21 are secured to a wall or the like to maintain the same in vertical position. Secured to the standards 21 and to the cross bar 22, as with the aid of angle brackets 23 are a pair of arms 24 which are adapted to carry a film holding chamber as hereinafter described. As shown in Figs. 5 and 6, each arm 24 is formed with a pair of slots 25 spaced along a horizontal plane. Secured to opposite faces of each arm 24 are metallic plates 26, there being an upper and lower of these plates 26 at each side of the arm as shown in Fig. 5, and these plates 26 being spaced from each other to furnish grooves or tracks 27 which are in register with the horizontally elongated slots 25. At the outer ends of the arms 24, these tracks 27 may be open. Disposed at the outer side of each arm 24 is a strip-like plate 28 which is formed with holes therethrough to receive the respective stud element 29 and shaft element 30. At the inner side of each arm 24 is a plate or strip-like member 31 formed at one end with a hole for receiving the stud 29. At its other end the member 31 is enlarged as shown at 32, this enlargement being formed with a hole for receiving the shaft 30, and having along its upper portion a rack 33 that is horizontally disposed. It will be perceived that the plates 26 are positioned between the arm 24 and the respective members 28 and 31.

Pivotally mounted on the studs 29 is a horizontal frame or box-like structure 34. The latter is adapted for tilting movement about the axis of the studs 29 and for horizontal movement along the arms 24 with the studs 29 moving along the slots 25, and being thus carried in the track 27 formed by the plates 26. To cause a horizontal movement of the member 34, a pinion 35 is fixedly mounted on a shaft 36, which shaft is suitably journaled on the arms 24, with the pinions 35 being in engagement with their respective adjacent racks 33. At one end of the shaft 36 is a hand wheel 37 for manually turning the shaft 36, whereby the racks 33 and consequently their plates 31 are horizontally slid, being carried by the elements 29, 30 slidable in the slots 25. This movement of the plates 31 will cause both of these elements 29 and 30 to simultaneously and equally slide along the slots 25.

To cause tilting movement of the box-like member 34, a bracket 38 is secured to the rear wall thereof and carries an arcuate rack 39 which is thus in fixed relation to the member 34. Engaging the rack 39 is a pinion 40 which is carried by the shaft 30. Consequently this rack and its assembly moves as a unit in the horiozntal direction with the member 34. For turning the shaft 30 a finger piece 41 is mounted thereon, the operation of which is wholly independent of the operation caused by the hand wheel 37.

To releasably lock the shaft 30, a device 42 is provided which may comprise a pinion 43 fixed on the shaft 30. Engageable with the pinion 43 is a tooth 44 of a bar 45 which is pivotally mounted at 46 on a screw secured to an arm 24. At one end of the bar 45, a tension coil spring 47 secures the same to a point on the arm 24 to hold the tooth 44 tightly in engagement with a tooth of the pinion 43. At the other end of the bar 45 is provided a finger piece 48 and an opposed finger piece 49 fixedly secured to the arm 24. The arrangement is such that the operator may press the finger pieces 48, 49 toward each other, to thus release the locking device. Accordingly the operator may hold the locking device 42 released with one hand, and with the other he may manipulate the knob 41 to rotate the shaft 30 for tilting the member 34.

Also mounted on the studs 29 are a pair of frame members 50 as shown in Fig. 1, these frame members being freely journaled on the studs 29 so as to be tiltable independently of the tilting movement of the member 34, but being horizontally movable with the member 34. The different frame members 50 may be independent of each other and each of them may have a straight track portion 51 at the top thereof. Removably seated in the track portions 51 is a casing 52 which thus holds the members 50 at a like angle of tilt. The casing 52 may constitute the hood for light controlling chamber 53 which may be mounted on the member 34 in fixed relation thereto. The relative tilting motion between the hood 52 and the chamber 53 is effected along an arc as shown in Fig. 3, the center of the arc being the studs 29 about which the frame members 50 pivot when the hood 52 is tilted. To avoid leakage of light, the chamber 53 may have a wall 54 in contact with which the hood 52 is externally slidable, and said chamber also having on opposite sides arcuate overlapping wall portions 55 to overlap the sliding joint and prevent leakage of light rays. To retain the hood 52 in adjusted position, a tongue 56 may be secured to the chamber 53, this tongue having a slot 57 to receive a set screw 58 which is affixed to the hood 52 and passes through said slot, and is adapted to clamp the tongue 56 to the hood to prevent relative movement.

Secured to the top of the hood 52 is a bracket structure 59 carrying any suitable source of light 60 which may be in the nature of a convoluted Neon tube suitably connected to any desired source of current. In order to permit removal of the heat of this source of light, while preventing undue egress of light rays, the hood 52 may be formed with an elongated outlet 61 upon which is removably snugly fitted a dome 62 having a series of small top perforations or openings 63. To afford additional ventilation, I may provide a lateral extension or chamber 64 for the hood communicating therewith through an opening 65 and having an upwardly directed outlet 66 positioned at one end away from the point of maximum light intensity.

Disposed in the lower part of the chamber 53 is a sheet of light diffusing material, such as the glass 67, which is thus in fixed relation to the chamber 53, whereas the source light 60 which substantially fills the chamber 53 is tiltable with the hood 52 as hereinabove described.

The box-like structure 34 is formed with a front opening to receive a film holder support 68 which is arranged for complete removability as indicated in Fig. 10. Its upper and lower walls are formed with large registering openings 69, the upper of which communicates with the light diffusing medium 67, and the lower of which communicates with a flexible bellows 70 which is fixedly secured to the bottom wall of the member 34. The support 68 may be generally rectangular in shape and may be formed with a large central circular opening 71, the adjacent portions of which form a shoulder or shelf for carrying a ring shaped frame 72. Removability of this frame 72 may be prevented by small metal plates 73, secured to the frame 72, and serving as clips, which at the sides and rear engage in the circular groove 73a of the support 68. The groove 73a terminates at the points 74 at which there is a substantial cut out 75 underneath the shoulder formed at the opening 71. Consequently the clip 73 at the front engages underneath a lip portion of the shoulder, but the sliding surface is in alignment with the groove 73a so that the frame 72 may be turned through a complete circle while being retained by the several clips 73.

To cause the turning movement of the frame 72, an arcuate rack 76 is affixed thereto as shown in Fig. 10, in engagement with a pinion 77 which is rotatably mounted in the front wall of the support 68, and is actuable by a knob or finger piece 78. It will now be seen that the frame 72 may be angularly set as desired regardless whether the support 68 be within or outside of the member 34.

The frame 72 is preferably formed with a rectangular opening which is arranged to interchangeably receive film holders for films of different sizes. A film holder of film of large size is shown in Figs. 3 and 10 and includes a frame member 79 having a central opening for a glass 80 of transparent or translucent character. This frame member 79 is of generally angular form for angular engagement with the frame 72, so as to rest thereon and to be centered by the opening thereof. Fixed on the frame member 79 is a generally rectangular frame 81 consisting of angle elements, arranged in opposed relation to the member 79 to provide therewith tracks or grooves for slidably retaining a plurality of film holding strips 82 of flexible character. These strips 82 are equally slidable toward and away from each other to thus provide squares or rectangles of different sizes according to the size of the film which is placed beneath the strips 82. In general, the latter constitute a structure similar to that of a shutter. To resiliently bear down on the strips 82 for causing the same to snugly overlie the film and hold the latter securely in position, a plurality of strip springs 83 are secured to the frame member 81 at the points 84 so that these springs are individually horizontally swingable on and off from the strips 82. Accordingly, these springs 83 are moved out of the way until a film has been positioned and the shutter adjusted, after which the springs 83 are swung to the position shown in Fig. 10 to cause the film to be held in place. Formed on certain of the angle members 81, suitable indicia may be provided which may comprise scales and notches as indicated at 81a to facilitate the placement of a film in a predetermined position.

For smaller film, I prefer to use a film holder which may comprise the parts shown in Figs. 11, 12, and 13, the assembly relation of which is shown in Fig. 14. As thus assembled, it will be perceived that the holder for the smaller film will be readily substituted upon the frame 72, when the frame member 79 is removed, after withdrawal of the support 68 from the member 34. This holder for the film of smaller size may comprise a frame member 85 which may be generally like that shown at 79 and may be similarly mounted on the member 72, except that the frame member 85 has a greater depth as shown in Fig. 14 in order to permit the film 86 to be brought into a lower position for suitable proximity or in desired focal relation to the lens unit 87. The holder 85 may have a suitable small bottom opening registering with an opening of equal size formed in a strip member 85a which extends along the bottom wall and the opposite ends of which are upwardly curved toward each other as at 88. Secured to the holder 85 and overlying the strip member 85a is a generally rectangular frame 89. Removably seated within the opening of the frame 89 is a holder 90 which is particularly adapted for a strip of film such as shown at 86. This holder 90 may be formed as an elongated trackway for the film 86, with a light opening 91 in the bottom and with flanges 92 to overlie the edge portions of the film, and a finger piece 93 being secured to one of said flanges to facilitate removal of the holder 90 from the holder 85. In operation, the holder 90 sets into the opening in the frame 89 and holds the film 86 in slidable position along the top surface of the frame 89, with the curved end portions 88 serving as stops to facilitate positioning of the film.

When the holder is placed in the frame 72 in place of the holder 79, the frame 72 may be angularly adjusted as before by means of the knob 74.

Slidably mounted on the standards 21 is a support comprising a pair of arms 94, to which are secured plates 95 carrying spaced wheels or bearing elements 96 for non frictional holding engagement with opposite faces of the standards 21 in course of the vertical sliding movement of the arms 94, as shown in Fig. 4. Controlling this sliding movement is a shaft 97 journaled in the arms 94 and carrying a knob 98 and pinions 99 which engage the rack bars 100 that are fixed to the respective standards 21. To counter balance the weight of the arms 94 and such structure as they may carry, I prefer to secure a bracket 101 to the cross bar 22, said bracket carrying a pulley 102 over which is trained a flexible element 103, one end of which is fixed to a cross bar 104 of the arms 94, and to the other end of which is secured a counterweight 105. This counterweight 105 may be formed with a plurality of spaced upright holes or passages for guidingly engaging a pair of rods 106 which are fixed at their upper ends to the cross bar 22 and at their lower ends in a cross bar 107 of the standards 21. Fixedly mounted on the arms 94 are their respective tracks 108 which extend horizontally thereof. Slidably mounted on these tracks is a frame member 109 having at the front thereof a handle 110 whereby the same may be slid frontward and rearward along the arms 94. A transversely slidable frame member 111 is mounted on the member 109 as particularly shown in Fig. 15, this frame member 111 having rabbeted or angular engagement with the member 109 and being adapted to pass over the tops of the arms 94. Secured to the member 111 at opposite sides thereof are handles 112 so that the member 111 may be moved to the right or to the left. Fixedly engaged with the member 111 is the lens unit 87. It will now be seen that on manipulating the handle 110, the member 109 is moved frontward and rearward with corresponding deflection of the bellows 70, and of course with corresponding movement of the lens unit 87. Upon manipulation of the handles 112, the bellows 70 is not moved, since it rests slidingly on member 111 as shown in Fig. 15, to avoid straining the bellows, but the lens unit is moved, and this change in setting of the apparatus has been found to be sufficient for a practically universal adjustment of the lens unit 87, while maintaining an absolutely light-tight engagement with the bellows 70. If desired, the bellows 70 may be regarded as being in sliding engagement with member 109 as suggested in Figs. 3 and 15. Of course the members 109 and 111 have openings of sufficient size for continuous register with each other and with the lens unit so that the latter may function in an unobstructed manner upon any adjustment. With any required adjustment as described, these elements carried by the arms 94 are also movable up and down as already referred to.

A plurality of superposed tracks 113 are mounted on brackets 114 affixed to the member 109 for receiving different light diffusing mediums 115 shown in dot-dash lines in Fig. 15, whereby either of these elements 115 may be slid into register with the lens unit 87.

In order to releasably lock the arms 94 in any desired vertical position, a locking device 116 may be provided as shown in Figs. 2 and 8. For this purpose a gear 117 may be rotatably mounted on one of the arms 94 in engagement with the pinion 99. Engaging this idler gear 117 is a pinion 118 which is freely journaled on a stub shaft 119 that is non-rotatably fixed to this arm 94. A portion of the shaft 119 is threaded to receive a finger piece 120 which operates as a clutch to frictionally clamp the pinion 118 when the knob 120 is tightened, whereby rotation of the shaft 97 is prevented. When the clutch action is released, the arms 94 may be readily moved upward and downward directly, and without manual actuation of the knobs 98, with the pinion 99 merely running free and idle along the rack 100. To prevent possible excessive impact of member 109 upon inward movement, I mount the elastic bumper elements 121 on the cross bar 104 as shown in Fig. 3.

If the operator is bending down low upon the work table hereinafter described, and can not readily reach the arm 98, I provide an additional knob 122 upon the end of a flexible shaft as shown in Fig. 1. This shaft 123 may be only partly flexible and may include a swivel joint 124 which is connected with a shaft 125 on a bracket 126 affixed to an arm 94 and carrying a bevel gear 127 engaging a bevel gear 128 that is secured to the shaft 97. It will now be apparent that the operator can readily reach the knob 122 and operate the same in lieu of the knob 98 for the same purpose.

Disposed beneath the lens unit and adapted to register therewith is a work table 129 which is pivotally mounted at 130 on a pair of arms 131. Secured to each of these arms is a guide structure 132 slidably engageable with its respective standard 21 and having for this purpose a plate 95 and rollers 96 as hereinbefore described, and operating in the same manner for anti-friction vertical movement of the arms 131. Interconnecting the members 132 is a cross bar 133 whereby the arms 131 are movable as a unit and constitute a rigid structure. Journaled in the members 132 is a shaft 134 carrying pinions 135 that engage rack bars 136 fixed on the standards 21, but the teeth of which may have a greater pitch than those of the racks 100. For turning the shaft 134 a knob 137 is provided together with an adjacent pinion 138. A releasable locking device 139, shown in detail in Fig. 9, may comprise a pair of arms 140 pivotally mounted at 141 on one of the arms 131 and being interconnected by a tension coil spring 142 whereby their teeth 143 engage the pinion 138 along a diameter. To release the lock 139, a cam element 144 may be rotatable by means of a stub shaft 145 having affixed thereto a knob 146.

The angularity of the arms 131 prevents obstruction by the latter of the work table 129 when the latter is tilted backward.

For angularly adjusting the table 129, a rack bar 147 may be pivotally connected thereto at one end at 148. Engaging this rack bar is a pinion 149 mounted on a shaft 150 that is journaled in a bracket 151 fixed on the cross bar 133. To maintain the rack in engagement with the pinion 149 and to allow for the tilting movement of the rack 147, I may provide an idler 152 on a shaft 153 mounted in the slot 154 of the brackets 151. A pair of tension coil springs 155 may engage around the shaft 153 so as to pull the idler resiliently into contact with the rack 147. The springs 155 are mounted on the brackets 151 so that a compact unit is thus provided.

On the free end of the shaft 150 is provided a knob 156 for manipulating the pinion 149. To releasably lock the table 129 in tilted position, a locking device such as 42 and operating in the same manner as hereinbefore described, is provided.

In order to counterbalance the weight of the table 129, together with its movable supporting means, a plurality of counterweights 157 may be connected to flexible elements 158 trained over pulleys 102 of the brackets 101 as hereinbefore described, the other ends of the elements 158 being connected at 159 to a cross bar 160 of the guide structure 132. A plurality of the counterweights 157 may be provided for even weight distribution, and these counterweights may have holes or passages therethrough so that each may be guided for vertical sliding movement upon a pair of rods 161 which are exactly like those shown at 106 and are mounted in the same manner as the latter.

In operation, this apparatus may be used for enlarging or reducing both large and small films, whereas heretofore different machines were required for large and small films. At the same time a variety of effects can be attained, as by correcting for angles at which the pictures were taken or modifying the angles. Moreover, variations in light distribution or intensity are attainable with uniform effects and gradual variation. And finally, this invention affords a great variety of settings for different conditions to meet every problem that may be encountered in the practise of the highly skilled photographer and to satisfy all of his requirements and ideas of procedure, as well as his needs for rapid and workmanlike production of the pictures.

Briefly, in operation, the operator places the large film in the holder 79 using the strips 82 as a shutter and the springs 83 to reliably clamp the film. He then inserts the support 68, which carries the holder 79, into the box-like frame 34, and turns on the light 60. The enlargement paper is placed on the table 129, and now the following settings can be made:

(1) The work table 129 can be tilted and raised or lowered, by operation of the respective knobs 156 and 137.

(2) The lens unit 87 may be raised or lowered by manipulation of either of the knobs 98 and 122.

(3) The lens unit 87 may be universally horizontally set by movement of the frames 109 and 111.

(4) The film holder 79 may be angularly adjusted in its horizontal plane, as by the knob 78.

(5) The film holder 79 may be tilted relative to the horizontal by the knob 41.

(6) The source of light on the dome 52 may be independently tilted on the studs 29.

(7) The film holder 79 may be shifted frontward or rearward by the handwheel 37.

(8) By substituting the holder 85 for the holder 79, and reinserting the box member 68, the apparatus is directly available for small films or pictures, with all of the foregoing settings, and with the film held in closer proximity to the lens unit 87 according to the necessary focal length.

By the provision of the member 85, small films may be brought much closer to the lens unit, as hereinbefore noted, and this is important because when the bellows is fully collapsed, it will offer a certain bulk which will space the lens unit away from the film holder a greater distance than would be required for work that is to be done with small film. It is this limitation which is overcome by substituting a member 85 in place of the film holder shown in Fig. 10.

I claim:

1. A photographic enlarging machine including a chamber having means therein for holding a film, said chamber having a top opening, a hood for closing said opening engageable with said chamber along an arcuate surface, a light directing means mounted in said hood, and means for mounting the hood for tilting movement relative to said chamber.

2. A photographic enlarging machine including a first chamber having means for mounting a light directing means, a second chamber having film holding means, the chambers being pivotally movable to each other in light sealing relationship, a support, common pivotal means mounting the chambers on the support, actuator means for causing pivotal movement of one of the chambers, and means to cause movement of the common pivotal means and the actuator means along the support to focus the film of the holding means on a work table.

HENRY HJORT.